US012654757B2

(12) United States Patent (10) Patent No.: US 12,654,757 B2
Yi et al. (45) Date of Patent: Jun. 16, 2026

(54) BABY SEAT ASSEMBLY

(71) Applicant: Artsana S.p.A., Grandate CO (IT)

(72) Inventors: Liwei Yi, Zhongshan City (CN);
Jiancheng Xiang, Zhongshan City
(CN)

(73) Assignee: Artsana S.p.A., Grandate CO (IT)

( * ) Notice: Subject to any disclaimer, the term of this
patent is extended or adjusted under 35
U.S.C. 154(b) by 135 days.

(21) Appl. No.: 18/675,325

(22) Filed: May 28, 2024

(65) Prior Publication Data

US 2024/0409148 A1 Dec. 12, 2024

(30) Foreign Application Priority Data

Jun. 7, 2023 (CN) .......................... 202321450229.6

(51) Int. Cl.
B62B 7/14 (2006.01)
B62B 9/10 (2006.01)
B62B 9/24 (2006.01)

(52) U.S. Cl.
CPC .............. B62B 7/142 (2013.01); B62B 9/102
(2013.01); B62B 9/24 (2013.01)

(58) Field of Classification Search
CPC ............ B62B 9/104; B62B 7/14; A47D 1/006

USPC ...................................................... 297/256.16
See application file for complete search history.

(56) References Cited

U.S. PATENT DOCUMENTS 11,173,940 B2 * 11/2021 Ruggiero ................ B62B 9/245
11,439,250 B2 * 9/2022 Zhong ...................... A47D 1/02

FOREIGN PATENT DOCUMENTS

CN 108001513 A * 5/2018 ............. B62B 9/104
CN 216833856 U * 6/2022 ............... B62B 7/14

* cited by examiner

*Primary Examiner* — Sarah B Mcpartlin
(74) *Attorney, Agent, or Firm* — Rankin Hill & Clark,
LLP; Erik J. Overberger

(57) ABSTRACT

A baby seat assembly includes a connecting seat rotatably
connected with a supporting seat, which is connected with a
seat rod. The supporting seat is rotatably connected with a
backrest foldable relative to the seat rod. The supporting seat
is further rotatably connected with a front handrail foldable
relative to the seat rod. The backrest is provided with a first
unlocking component capable of driving a third locking
mechanism to unlock after a second locking mechanism is
unlocked and when the backrest is rotated and folded
relative to the seat rod, and a second unlocking component
capable of driving a first locking mechanism to unlock after
the third locking mechanism is unlocked and when the front
handrail is rotated and folded relative to the seat rod.

7 Claims, 7 Drawing Sheets

BABY SEAT ASSEMBLY

TECHNICAL FIELD

The invention relates to a baby seat assembly.

BACKGROUND ART

The baby strollers are common products in the growth process of babies. The current baby stroller generally includes a baby stroller frame and a baby seat assembly connected to the baby stroller frame. The baby seat assembly generally includes a seat rod, a front handrail and a backrest. When the baby stroller is folded, firstly, the baby seat assembly generally needs to be folded, a locking mechanism between the front handrail and the seat rod is firstly unlocked, and the front handrail is forwards rotated to be close to the seat rod; and then, a locking mechanism between the backrest and the seat rod is unlocked, and the backrest is forwards rotated to be close to the seat rod. Therefore, when the seat assembly is folded, the unlocking operation needs to be performed twice, and the operation is relatively cumbersome. In addition, after folding the baby seat assembly is completed, a locking device between the baby seat assembly and the frame needs to be additionally operated for unlocking, so that the baby seat assembly rotates relative to the frame to be closed to the frame. Therefore, when the baby stroller is folded, more unlocking steps are needed, and the folding operation is relatively complicated.

Therefore, the invention appears based on the above-mentioned deficiencies.

SUMMARY OF THE INVENTION

The objects of the invention are to overcome the deficiencies in the prior art and provide a baby seat assembly simple in structure and convenient for folding operation.

The invention is realized by the following technical solutions.

A baby seat assembly includes a connecting seat 1 capable of being fixedly connected to a baby stroller frame, wherein the connecting seat 1 is connected with a supporting seat 2 capable of rotating relative to the same, the supporting seat 2 is connected with a seat rod 3, a first locking mechanism 4 for locking the supporting seat 2 and the connecting seat 1 is provided between the both, the supporting seat 2 is further rotatably connected with a backrest 5 foldable relative to the seat rod 3, a second locking mechanism 6 for locking the backrest 5 and the supporting seat 2 is provided between the both, the supporting seat 2 is further rotatably connected with a front handrail 7 foldable relative to the seat rod 3, and a third locking mechanism 8 for locking the front handrail 7 and the supporting seat 2 is provided between the both; in addition, the backrest 5 is provided with a first unlocking component 9 capable of driving the third locking mechanism 8 to unlock after the second locking mechanism 6 is unlocked and when the backrest 5 is rotated and folded relative to the seat rod 3, and a second unlocking component 10 capable of driving the first locking mechanism 4 to unlock after the third locking mechanism 8 is unlocked and when the front handrail 7 is rotated and folded relative to the seat rod 3 is provided between the front handrail 7 and the first locking mechanism 4.

The first locking mechanism 4 includes a plurality of first latching grooves 41 formed in one side of the supporting seat 2, the connecting seat 1 is provided with a plurality of second latching grooves 42, a latching block 43 which can engage with the first latching grooves 41 and the second latching grooves 42 at the same time and can be pushed by the second unlocking component 10 so as to disengage from the first latching grooves 41 is provided between the supporting seat 2 and the connecting seat 1, and first reset springs 44 capable of pushing the latching block 43 to reset are further provided between the latching block 43 and the connecting seat 1. The third locking mechanism 8 includes a plurality of third latching grooves 81 formed in the other side of the supporting seat 2, the front handrail 7 is provided with a plurality of fourth latching grooves 82, a spline 83 which can engage with the fourth latching grooves 82 and the third latching grooves 81 at the same time and can be pushed by the first unlocking component 9 so as to disengage from the third latching grooves 81 is provided between the front handrail 7 and the supporting seat 2, and second reset springs 84 capable of pushing the spline 83 to reset are further provided between the spline 83 and the front handrail 7.

The first unlocking component 9 includes a protrusion 91 formed on a lower end of the backrest 5, the protrusion 91 is provided with an inclined surface 92, and the spline 83 is provided with a boss 93 which can be pushed by the inclined surface 92 to enable the spline 83 to disengage from the third latching grooves 81 when the backrest 5 is rotated and folded relative to the seat rod 3.

The second unlocking component 10 includes an unlocking block 101 formed between the front handrail 7 and the latching block 43 and capable of laterally moving and rotating, the unlocking block 101 is provided with a plurality of chutes 102 in a circumferential direction, and a lower end of the front handrail 7 is provided with a plurality of inclined projections 103 cooperating with the chutes 102 and capable of pushing the unlocking block 101 to laterally move when the front handrail 7 is rotated and folded relative to the seat rod 3.

The second locking mechanism 6 includes a plurality of locking grooves 61 formed in the supporting seat 2 in a circumferential direction, a locking pin 62 capable of sliding therein and engaging with or disengaging from the locking grooves 61 is provided in the backrest 5, the locking pin 62 is connected with a pull rope 63 capable of pulling the same to slide, the backrest 5 is provided with an operating switch 64 connected with the pull rope 63 and used for pulling the pull rope 63, and a third reset spring 65 for pushing the locking pin 62 to reset is further provided in the backrest 5.

The connecting seat 1 is provided with a locking device capable of detachably connecting the connecting seat to the baby stroller frame, the locking device includes a locking part 30 capable of sliding in the connecting seat 1 so as to engage with or disengage from clamping grooves 200 in the baby stroller frame, the locking part 30 includes a body 301 provided with locking rods 302 capable of engaging with or disengaging from the clamping grooves 200, the body 301 is provided with a first slope 303, the connecting seat 1 is provided with exposed operating knobs 304, the operating knobs 304 are provided with second slopes 305 cooperating with the first slope 303 and capable of pushing the locking part 30 to laterally move when the operating knobs 304 vertically move, and a fourth reset spring 306 capable of driving the locking part 30 to reset is further provided between the body 301 and the connecting seat 1.

The body 301 is further provided with an unlocking retention component capable of cooperating with the baby stroller frame to retain the locking rods 302 and the clamping grooves 200 in a disengaged state when the locking device is unlocked, the unlocking retention component includes a sunken groove 401 formed in the body 301, the sunken groove 401 is internally provided with a sliding block 402 capable of sliding therein, the sliding block 402 is provided with a projection part 403 extending out of the connecting seat 1, capable of cooperating with two grooves 500 spaced from each other in the baby stroller frame, and having an arc end surface, and a fifth reset spring 404 capable of pushing the sliding block 402 to reset is further provided between the sliding block 402 and the body 301.

Compared with the prior art, the invention has the following advantages:

1. When the baby seat assembly in the invention is folded, the second locking mechanism between the backrest and the supporting seat is firstly unlocked, the backrest can rotate to be close to the seat rod after the second locking mechanism is unlocked, and in this process, the first unlocking component on the backrest drives the third unlocking mechanism between the front handrail and the supporting seat to unlock; after the third locking mechanism is unlocked, the front handrail can rotate to be close to the seat rod, and in this process, the front handrail in the rotation process further drives the first locking mechanism on the supporting seat and the connecting seat to unlock through the second unlocking component, at the moment, the backrest, the front handrail and the seat rod can be used as a whole to rotate relative to the connecting seat, so that the backrest, the front handrail and the seat rod are used as a whole to be close to the baby stroller frame so as to be folded. Therefore, the rotation and folding of the backrest, the front handrail and the whole baby seat assembly relative to the frame are realized by only operating the second locking mechanism to unlock and rotating the backrest forwards, so that the folding operation for the baby seat assembly is convenient and rapid.

2. Detachable connection between the baby seat assembly in the invention and the baby stroller frame is realized by the locking device between the connecting seat and the baby stroller frame; and when the locking rods disengage from the clamping grooves in the baby stroller frame, the unlocking retention component can retain the locking rods and the clamping grooves in the baby stroller frame in a disengaged state, so that a user frees up a hand to operate the locking device on the other side of the baby seat assembly to unlock, and then, the baby seat assembly can be conveniently taken down from the baby stroller frame.

3. The baby seat assembly in the invention is simple in structure, convenient for folding operation, convenient to disengage from the baby stroller frame, and applicable to popularization and application.

DETAILED DESCRIPTION OF THE INVENTION

Figure 1:
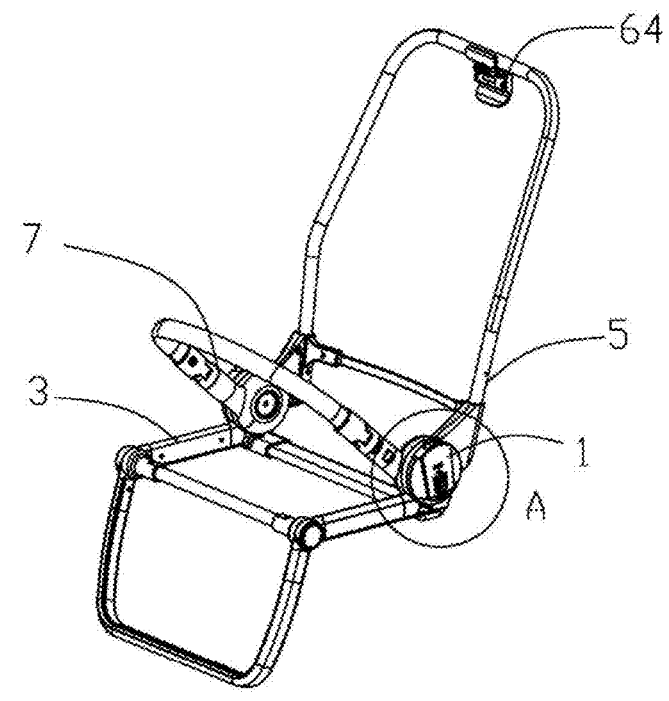
FIG. 1 is a perspective view of the invention.
Figure 2:
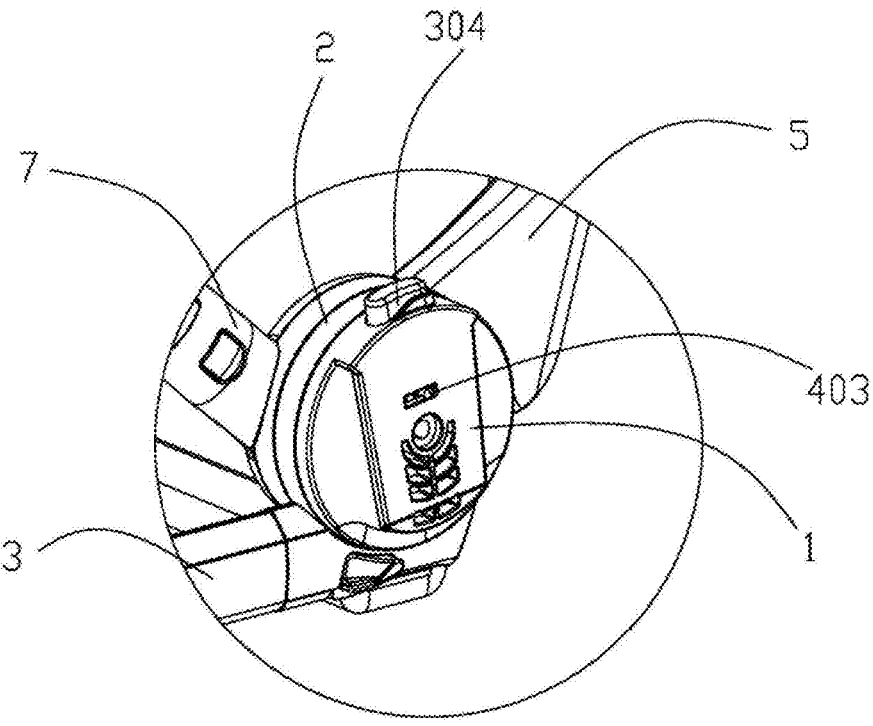
FIG. 2 is an enlarged view at A in FIG. 1.
Figure 3:
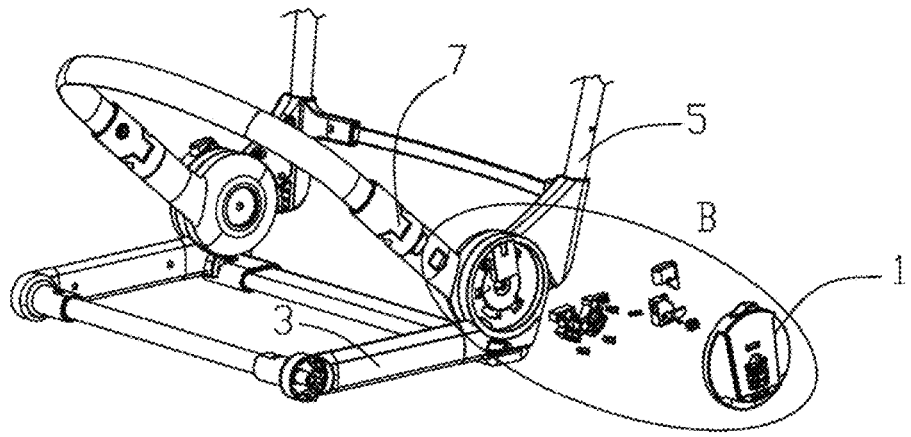
FIG. 3 is an exploded view I of components of the invention.

The invention will be further described below in conjunction with the accompanying drawings.

As shown in FIG. 1 to FIG. 7, a baby seat assembly includes a connecting seat 1 capable of being fixedly connected to a baby stroller frame, wherein the connecting seat 1 is connected with a supporting seat 2 capable of rotating relative to the same, the supporting seat 2 is connected with a seat rod 3, a first locking mechanism 4 for locking the supporting seat 2 and the connecting seat 1 is provided between the both, the supporting seat 2 is further rotatably connected with a backrest 5 foldable relative to the seat rod 3, a second locking mechanism 6 for locking the backrest 5 and the supporting seat 2 is provided between the both, the supporting seat 2 is further rotatably connected with a front handrail 7 foldable relative to the seat rod 3, and a third locking mechanism 8 for locking the front handrail 7 and the supporting seat 2 is provided between the both; in addition, the backrest 5 is provided with a first unlocking component 9 capable of driving the third locking mechanism 8 to unlock after the second locking mechanism 6 is unlocked and when the backrest 5 is rotated and folded relative to the seat rod 3, and a second unlocking component 10 capable of driving the first locking mechanism 4 to unlock after the third locking mechanism 8 is unlocked and when the front handrail 7 is rotated and folded relative to the seat rod 3 is provided between the front handrail 7 and the first locking mechanism 4. When the baby seat assembly is folded, the second locking mechanism 6 between the backrest 5 and the supporting seat 2 is firstly unlocked, the backrest 5 can rotate to be close to the seat rod 3 after the second locking mechanism 6 is unlocked, and in this process, the first unlocking component 9 on the backrest 5 drives the third unlocking mechanism 8 between the front handrail 7 and the supporting seat 2 to unlock; after the third locking mechanism 8 is unlocked, the front handrail 7 can rotate to be close to the seat rod 3, and in this process, the front handrail 7 in the rotation process further drives the first locking mechanism 4 between the supporting seat 2 and the connecting seat 1 to unlock through the second unlocking component 10, at the moment, the backrest 5, the front handrail 7 and the seat rod 3 can be used as a whole to rotate relative to the connecting seat 1, so that the backrest 5, the front handrail 7 and the seat rod 3 are used as a whole to be close to the baby stroller frame so as to be folded. Therefore, linkage unlocking of the third locking mechanism 8 and the first locking mechanism 4 is realized by only operating the second locking mechanism 6 to unlock and rotating the backrest 5 forwards, so that the backrest 5, the front handrail 7 and the whole baby seat assembly are rotated and folded relative to the frame, and the folding operation for the baby seat assembly is convenient and rapid.

Figure 4:
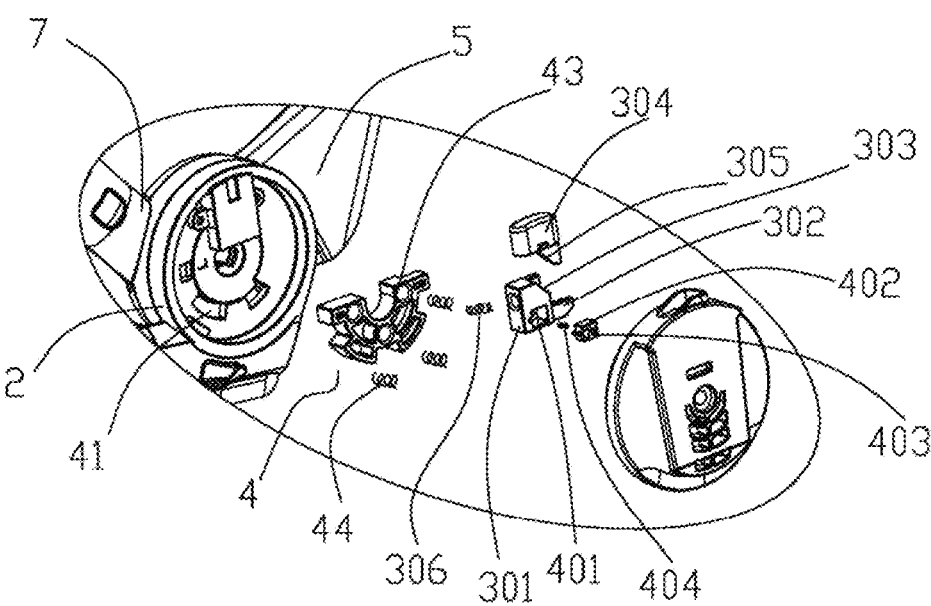
FIG. 4 is an enlarged view at B in FIG. 3.
Figure 5:
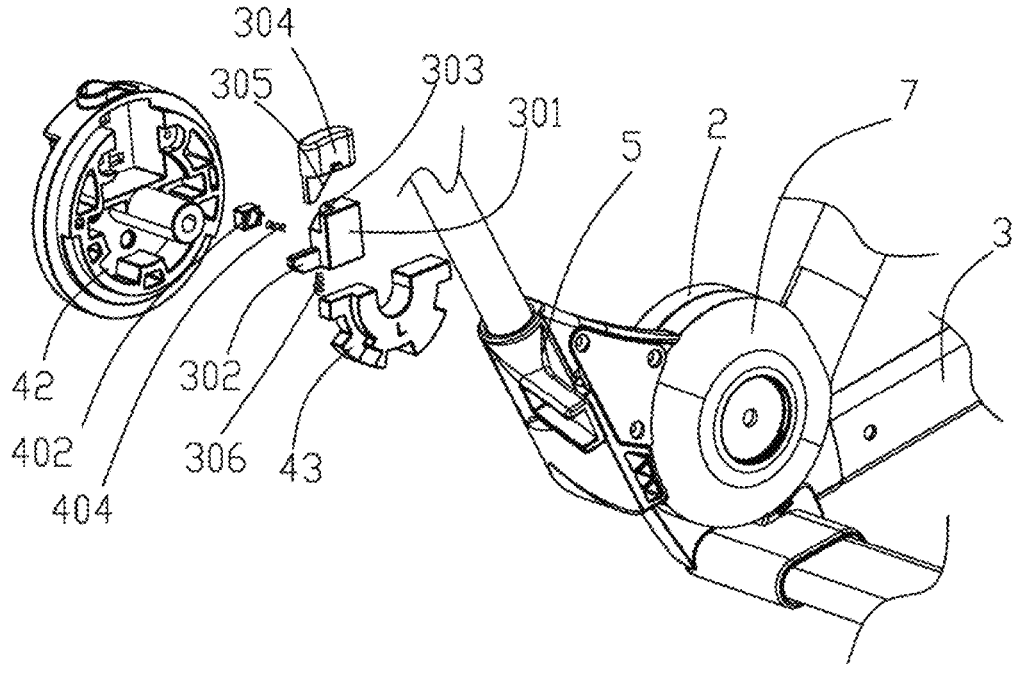
FIG. 5 is an exploded view II of components of the invention.
Figure 6:
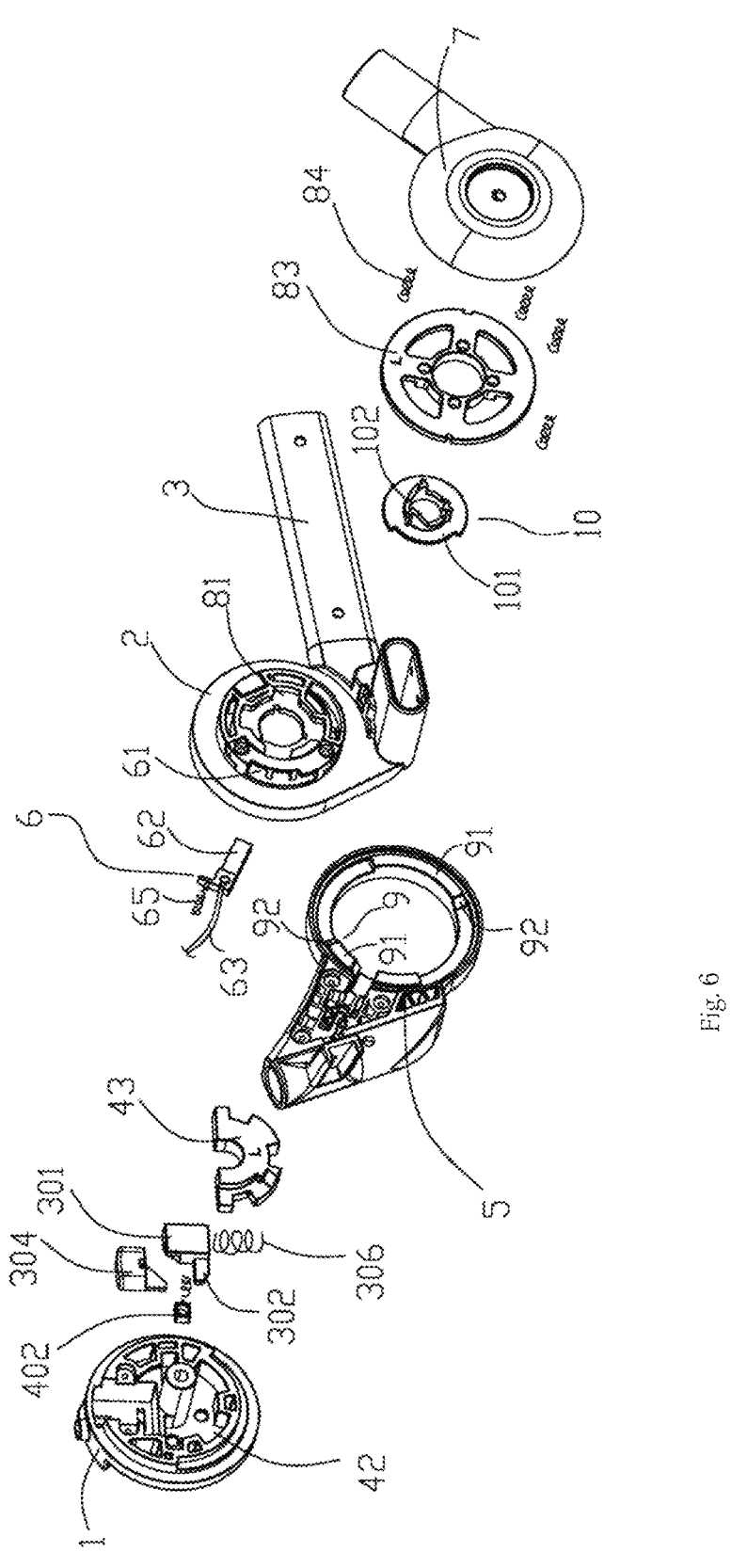
FIG. 6 is an exploded view III of components of the invention.
Figure 10:
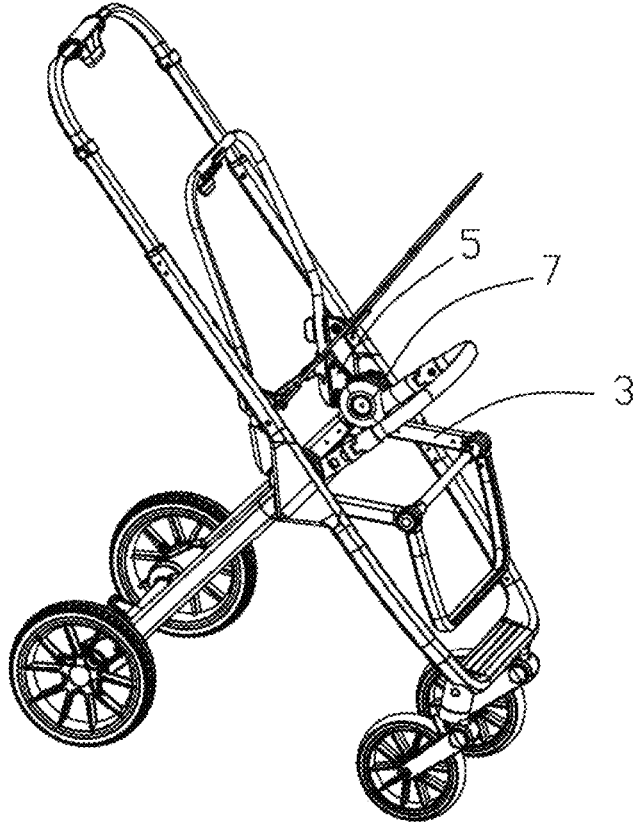
FIG. 10 is a perspective view shown when a baby seat assembly of the invention is mounted on a baby stroller frame.

As shown in FIG. 4 to FIG. 6, the first locking mechanism 4 includes a plurality of first latching grooves 41 formed in one side of the supporting seat 2, the connecting seat 1 is provided with a plurality of second latching grooves 42, a latching block 43 which can engage with the first latching grooves 41 and the second latching grooves 42 at the same time and can be pushed by the second unlocking component 10 so as to disengage from the first latching grooves 41 is provided between the supporting seat 2 and the connecting seat 1, and first reset springs 44 capable of pushing the latching block 43 to reset are further provided between the latching block 43 and the connecting seat 1. When the supporting seat 2 and the connecting seat 1 are kept unlocked, the baby seat assembly is in an unfolded state (as shown in FIG. 10) relative to the baby stroller frame; and after the second unlocking component 10 pushes the latching block 43 to disengage from the first latching grooves 41 in the supporting seat 2, the supporting seat 2 can rotate relative to the connecting seat 1, and thus, the rotation and folding of the baby seat assembly relative to the baby stroller frame are realized.

Figure 7:
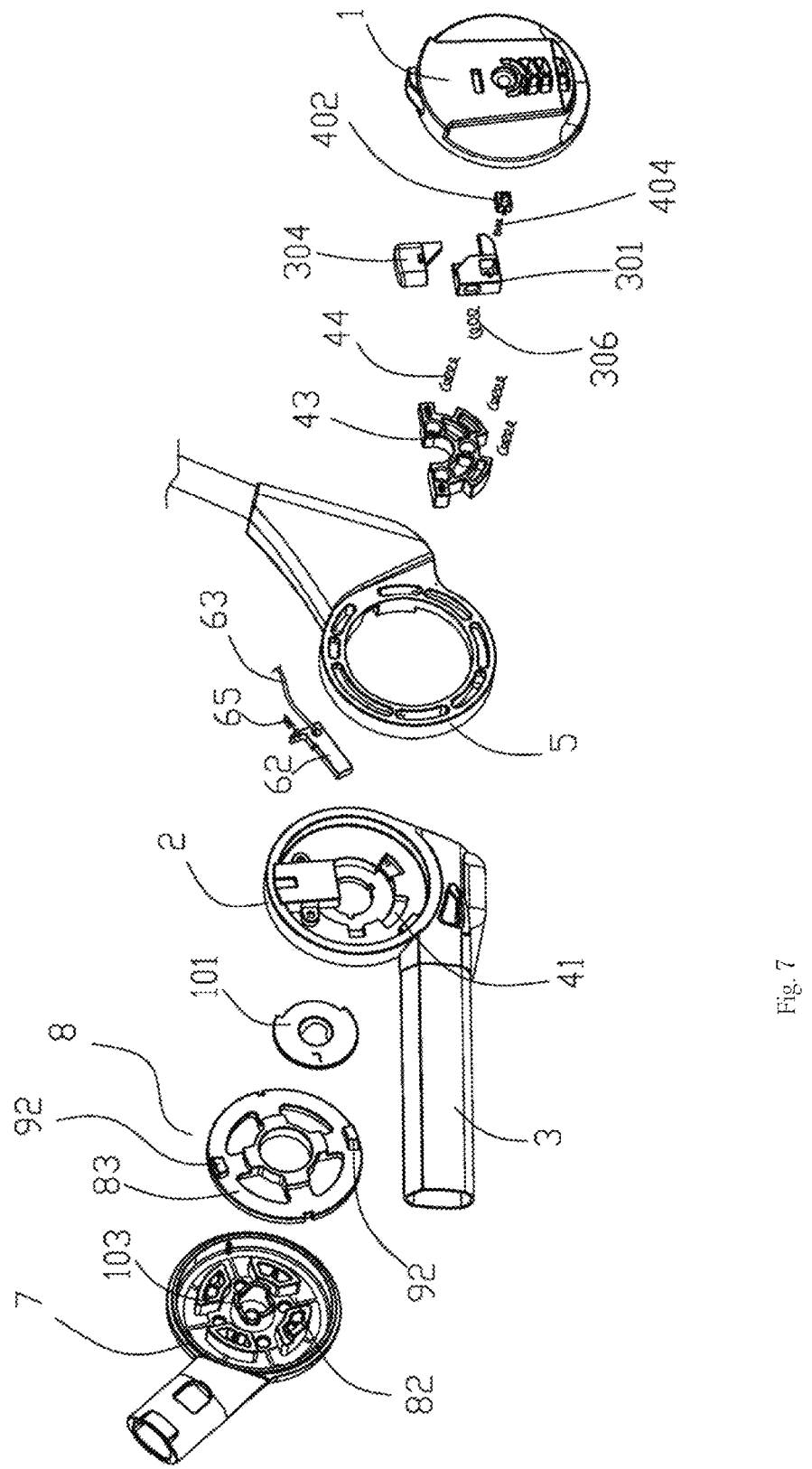
FIG. 7 is an exploded view IV of components of the invention.
Figure 8:
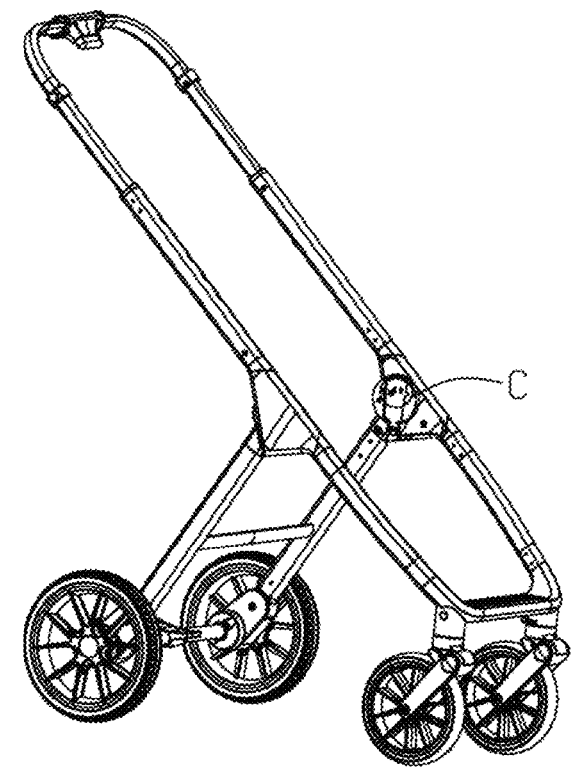
FIG. 8 is a schematic view of a baby stroller frame.

As shown in FIG. 6 and FIG. 7, the third locking mechanism 8 includes a plurality of third latching grooves 81 formed in the other side of the supporting seat 2, the front handrail 7 is provided with a plurality of fourth latching grooves 82, a spline 83 which can engage with the fourth latching grooves 82 and the third latching grooves 81 at the same time and can be pushed by the first unlocking component 9 so as to disengage from the third latching grooves 81 is provided between the front handrail 7 and the supporting seat 2, and second reset springs 84 capable of pushing the spline 83 to reset are further provided between the spline 83 and the front handrail 7. After the second locking mechanism 6 is unlocked and the backrest 5 rotates to be close to the seat rod 3, the first unlocking component 9 pushes the spline 83 to laterally move to disengage from the third latching grooves 81, and at the moment, the front handrail 7 can rotate to be close to the seat rod 3.

As shown in FIG. 6 and FIG. 7, the first unlocking component 9 includes a protrusion 91 formed on a lower end of the backrest 5, the protrusion 91 is provided with an inclined surface 92, and the spline 83 is provided with a boss 93 which can be pushed by the inclined surface 92 to enable the spline 83 to disengage from the third latching grooves 81 when the backrest 5 is rotated and folded relative to the seat rod 3. When the backrest 5 rotates to be close to the seat rod 3, the protrusion 91 rotates with the backrest 5, the inclined surface 92 pushes the boss 93 on the spline 83, thereby extruding the spline 83 to laterally move and then disengage from the third latching grooves 81 to unlock the third locking mechanism 8.

As shown in FIG. 6 and FIG. 7, the second unlocking component 10 includes an unlocking block 101 formed between the front handrail 7 and the latching block 43 and capable of laterally moving and rotating, the unlocking block 101 is provided with a plurality of chutes 102 in a circumferential direction, and a lower end of the front handrail 7 is provided with a plurality of inclined projections 103 cooperating with the chutes 102 and capable of pushing the unlocking block 101 to laterally move when the front handrail 7 is rotated and folded relative to the seat rod 3. When the front handrail 7 rotates to be close to the seat rod 3, the inclined projections 103 on the front handrail 7 rotate and eject the unlocking block 101; and since the inclined projections 103 abut against and cooperate with the chutes 102 in the unlocking block 101, the inclined projections 103 can push the unlocking block 101 to laterally move when rotating with the front handrail 7, then, the unlocking block 101 pushes the latching block 43 to disengage from the first latching grooves 41, and the second unlocking component 10 drives the first locking mechanism 4 to unlock. As shown in FIG. 1, FIG. 6 and FIG. 7, the second locking mechanism 6 includes a plurality of locking grooves 61 formed in the supporting seat 2 in a circumferential direction, a locking pin 62 capable of sliding therein and engaging with or disengaging from the locking grooves 61 is provided in the backrest 5, the locking pin 62 is connected with a pull rope 63 capable of pulling the same to slide, the backrest 5 is provided with an operating switch 64 connected with the pull rope 63 and used for pulling the pull rope 63, and a third reset spring 65 for pushing the locking pin 62 to reset is further provided in the backrest 5. When the second locking mechanism 6 needs to be unlocked, the operating switch 64 is triggered, the pull rope 63 is pulled to pull the locking pin 62 to disengage from the locking grooves 61, and thus, the second locking mechanism 6 is unlocked. At the moment, the backrest 5 can be rotated and folded to the seat rod 3. Moreover, in the present embodiment, there are a plurality of locking grooves 61. Therefore, when the locking pin 62 is inserted in the different locking grooves 61, the backrest 5 can stay on different inclined positions to ensure that a baby sits on a comfortable position.

Figure 9:
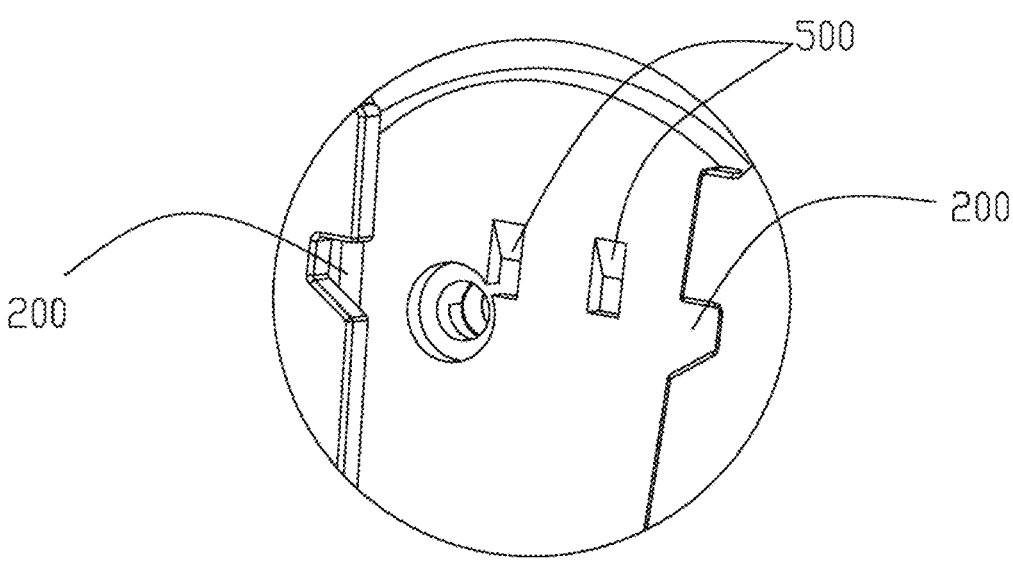
FIG. 9 is an enlarged view at C in FIG. 8.

As shown in FIG. 2 to FIG. 7, the connecting seat 1 is provided with a locking device capable of detachably connecting the connecting seat to the baby stroller frame, the locking device includes a locking part 30 capable of sliding in the connecting seat 1 so as to engage with or disengage from clamping grooves 200 in the baby stroller frame, the locking part 30 includes a body 301 provided with locking rods 302 capable of engaging with or disengaging from clamping grooves 200, the body 301 is provided with a first slope 303, the connecting seat 1 is provided with exposed operating knobs 304, the operating knobs 304 are provided with second slopes 305 cooperating with the first slope 303 and capable of pushing the locking part 30 to laterally move when the operating knobs 304 vertically move, and a fourth reset spring 306 capable of driving the locking part 30 to reset is further provided between the body 301 and the connecting seat 1. When the baby seat assembly needs to be taken down from the baby stroller frame, the operating knobs 304 are pressed, the second slopes 305 on the operating knobs 304 push the first slope 303 on the body 301, so that the operating knobs 304 can push the body 301 to laterally move, and when the body 301 laterally moves, the locking rods 302 disengage from the clamping grooves 200 in the baby stroller frame. When both of the locking rods 302 on two sides of the baby seat assembly disengage from the clamping grooves 200 in two sides of the baby stroller frame, the baby seat assembly can be taken away. When each side of the baby stroller frame is provided with the opposite clamping grooves 200 capable of engaging with the locking rods 302 (as shown in FIG. 9), the baby seat assembly is reversed back and forth by disassembling the baby seat assembly, then, rotating the baby seat assembly for 180 DEG, and then mounting the baby seat assembly on the baby stroller frame.

As shown in FIG. 2 to FIG. 9, the body 301 is further provided with an unlocking retention component capable of cooperating with the baby stroller frame to retain the locking rods 302 and the clamping grooves 200 in a disengaged state when the locking device is unlocked, the unlocking retention component includes a sunken groove 401 formed in the body 301, the sunken groove 401 is internally provided with a sliding block 402 capable of sliding therein, the sliding block 402 is provided with a projection part 403 extending out of the connecting seat 1, capable of cooperating with two grooves 500 spaced from each other in the baby stroller frame, and having an arc end surface, and a fifth reset spring 404 capable of pushing the sliding block 402 to reset is further provided between the sliding block 402 and the body 301. When the operating knobs 304 are pressed, the body 301 laterally moves, and the locking rods 302 disengage from the clamping grooves 200. Moreover, during lateral movement of the body 301, the projection part 403 of the sliding block 402 is extruded to enter from one groove 500 to the other groove 500; when the projection part 403 stays in the other groove 500, the locking rods 302 and the clamping grooves 200 are retained in the disengaged state, at the moment, a user frees up a hand to operate the locking rod 302 on the other side of the baby seat assembly to disengage from the clamping groove 200; and after both of the locking rods 302 on the two sides disengage from the clamping grooves 200, since an end of the projection part 403 is provided with an arc surface, edges of the grooves 500 can extrude the sliding block 402 to slide to the inside of the body 301 when the baby seat assembly is lifted up, so that the projection part 403 disengages from the grooves 500 to ensure that the baby seat assembly is disassembled. Therefore, when the baby seat assembly is disassembled, the operating knobs 304 on two sides of the baby seat assembly are firstly pressured, and then, the baby seat assembly is forcefully lifted up, which is very convenient and rapid to operate.

The invention claimed is:

1. A baby seat assembly comprising a connecting seat capable of being fixedly connected to a baby stroller frame, wherein the connecting seat is rotatably connected with a supporting seat, the supporting seat is connected with a seat rod, a first locking mechanism for locking the supporting seat and the connecting seat is provided between the supporting seat and the connecting seat, the supporting seat is further rotatably connected with a backrest foldable relative to the seat rod, a second locking mechanism for locking the backrest and the supporting seat is provided between the backrest and the supporting seat, the supporting seat is further rotatably connected with a front handrail foldable relative to the seat rod, and a third locking mechanism for locking the front handrail and the supporting seat is provided between the front handrail and the supporting seat; in addition, the backrest is provided with a first unlocking component capable of driving the third locking mechanism to unlock after the second locking mechanism is unlocked and when the backrest is rotated and folded relative to the seat rod, and a second unlocking component, capable of driving the first locking mechanism to unlock after the third locking mechanism is unlocked and when the front handrail is rotated and folded relative to the seat rod, is provided between the front handrail and the first locking mechanism, wherein the connecting seat is provided with a locking device capable of detachably connecting the connecting seat to the baby stroller frame, the locking device comprises a locking part capable of sliding in the connecting seat so as to engage with or disengage from clamping grooves in the baby stroller frame, the locking part comprises a body provided with locking rods capable of engaging with or disengaging from the clamping grooves, the body is provided with a first slope, the connecting seat is provided with exposed operating knobs, the operating knobs are provided with second slopes cooperating with the first slope and capable of pushing the locking part to laterally move when the operating knobs vertically move, and a fourth reset spring capable of driving the locking part to reset is further provided between the body and the connecting seat.

2. The baby seat assembly according to claim 1, wherein the first locking mechanism comprises a plurality of first latching grooves formed in one side of the supporting seat, the connecting seat is provided with a plurality of second latching grooves, a latching block which can engage with the first latching grooves and the second latching grooves at the same time and can be pushed by the second unlocking component so as to disengage from the first latching grooves is provided between the supporting seat and the connecting seat, and first reset springs capable of pushing the latching block to reset are further provided between the latching block and the connecting seat.

3. The baby seat assembly according to claim 2, wherein the third locking mechanism comprises a plurality of third latching grooves formed in the other side of the supporting seat, the front handrail is provided with a plurality of fourth latching grooves, a spline which can engage with the fourth latching grooves and the third latching grooves at the same time and can be pushed by the first unlocking component so as to disengage from the third latching grooves is provided between the front handrail and the supporting seat, and second reset springs capable of pushing the spline to reset are further provided between the spline and the front handrail.

4. The baby seat assembly according to claim 3, wherein the first unlocking component comprises a protrusion formed on a lower end of the backrest, the protrusion is provided with an inclined surface, and the spline is provided with a boss which can be pushed by the inclined surface to enable the spline to disengage from the third latching grooves when the backrest is rotated and folded relative to the seat rod.

5. The baby seat assembly according to claim 2, wherein the second unlocking component comprises an unlocking block formed between the front handrail and the latching block and capable of laterally moving and rotating, the unlocking block is provided with a plurality of chutes in a circumferential direction, and a lower end of the front handrail is provided with a plurality of inclined projections cooperating with the chutes and capable of pushing the unlocking block to laterally move when the front handrail is rotated and folded relative to the seat rod.

6. The baby seat assembly according to claim 1, wherein the second locking mechanism comprises a plurality of locking grooves formed in the supporting seat in a circumferential direction, a locking pin capable of sliding therein and engaging with or disengaging from the locking grooves is provided in the backrest, the locking pin is connected with a pull rope capable of pulling the locking pin to slide, the backrest is provided with an operating switch connected with the pull rope and used for pulling the pull rope, and a third reset spring for pushing the locking pin to reset is further provided in the backrest.

7. The baby seat assembly according to claim 1, wherein the body is further provided with an unlocking retention component capable of cooperating with the baby stroller frame to retain the locking rods and the clamping grooves in a disengaged state when the locking device is unlocked, the unlocking retention component comprises a sunken groove formed in the body, the sunken groove is internally provided with a sliding block capable of sliding therein, the sliding block is provided with a projection part extending out of the connecting seat, capable of cooperating with two grooves spaced from each other in the baby stroller frame, and having an arc end surface, and a fifth reset spring capable of pushing the sliding block to reset is further provided between the sliding block and the body.

* * * * *